United States Patent [19]

Behn et al.

[11] Patent Number: 4,598,335
[45] Date of Patent: Jul. 1, 1986

[54] IMPREGNATED WOUND CAPACITOR

[75] Inventors: Reinhard Behn, Munich; Josef Solar, Heidenheim, both of Fed. Rep. of Germany

[73] Assignee: Siemens Aktiengesellschaft, Berlin and Munich, Fed. Rep. of Germany

[21] Appl. No.: 690,272

[22] Filed: Jan. 10, 1985

[30] Foreign Application Priority Data

Jan. 24, 1984 [DE] Fed. Rep. of Germany ....... 3402340

[51] Int. Cl.$^4$ .......................... H01G 3/17; H01G 1/14
[52] U.S. Cl. ...................................... 361/314; 361/323
[58] Field of Search ............... 361/301, 273, 323, 324, 361/314, 433 W

[56] References Cited

U.S. PATENT DOCUMENTS

| 2,220,887 | 11/1940 | Claassen | 361/433 W |
| 2,858,492 | 10/1958 | Lamphier | 361/324 X |
| 3,419,770 | 12/1968 | Tomago et al. | 361/324 |
| 3,457,478 | 7/1969 | Lehrer | 361/323 X |

FOREIGN PATENT DOCUMENTS

| 5333 | 2/1971 | Japan | 361/324 |
| 62650 | 5/1977 | Japan | 361/314 |
| 417836 | 10/1934 | United Kingdom | 361/433 W |
| 461834 | 2/1937 | United Kingdom | 361/433 W |
| 859884 | 1/1961 | United Kingdom | 361/433 W |

Primary Examiner—Donald A. Griffin
Attorney, Agent, or Firm—Thomas H. Jackson

[57] ABSTRACT

An impregnated, wound capacitor comprises dielectric strips (1) which consists at least partially of plastic foils swelled by the impregnant. The electrodes of regenerably thin metal layers are connected at the end faces (S, S') of the capacitor coil with end contact layers. Impregnation holes (L) are arranged in the dielectrically active part of the coil such that the maximum spacing r, between successive holes on the capacitor surface, is equal to $R = r\sqrt{3}$, where r is the impregnation reach.

5 Claims, 5 Drawing Figures

IMPREGNATED WOUND CAPACITOR

BACKGROUND OF THE INVENTION

The invention relates to an impregnated wound capacitor comprised of dielectric strips which consist at least in part of plastic foils swelled by the impregnant. The electrodes of this capacitor are formed of regenerable, thin metal layers arranged adjacent at least a portion of the dielectric strips. The electrodes of opposite polarity are connected together, at the opposite end faces of the coil, with the end face contact layers. The coil is provided with impregnation holes.

A capacitor of this type is disclosed in the German Patent Publication (DAS) No. 1,000,529. In this known capacitor, the impregnation holes, which are to improve the impregnation ability of the capacitor coil, are arranged in the vicinity of the end contact layers in the dielectrically inactive part of the capacitor coil.

It has been found, however, that with coil widths greater than about 60 mm, it is difficult to impregnate such a capacitor. This is attributed to the fact that the impregnation holes in the dielectrically inactive part of the capacitor become ineffective due to the swelling of the plastic foils by the impregnant. As wider and wider capacitors e.g., 140 mm wide, are manufactured for technical and economic reasons, it is desirable to be able to impregnate the capacitor coils properly. It is, of course, possible to obtain fully impregnated capacitor coils by impregnating at low temperatures and possibly for long periods, but for economic reasons it is desirable to achieve shorter impregnation times.

SUMMARY OF THE INVENTION

It is an object of the present invention to provide a wound capacitor of the type described above which can be properly impregnated in a short time, even if the coil width is large.

This object, as well as other objects which will become apparent from the discussion that follows, are achieved, according to the invention, by arranging the impregnation holes in the dielectrically active part of the coil with the maximum spacing R between successive holes on the generated surface of the coil, equal to $r\sqrt{3}$, where r is the impregnation reach. Preferably the diameter of the impregnation holes is greater than 0.5 mm.

Further features of the invention consist in that (1) the dielectric foils are made of polypropylene and (2) the electrodes are made of paper strips provided with metal coatings on both sides, the paper strips themselves being disposed in the field-free space between their metallized surfaces. For polypropylene foils of 8 microns and paper strips of 9 microns, the impregnation holes advantageously have a diameter of 2 mm, the coil being impregnated with mineral oil.

Another feature of the invention consists in that the electrodes are arranged to provide an inner series connection, and that in regions of inner free strips or cavities, respectively, the impregnation holes extend in the radial direction.

For a full understanding of the present invention, reference should now be made to the following detailed description of preferred embodiments of the invention and to the accompanying drawings.

DESCRIPTION OF THE PREFERRED EMBODIMENT

Figure 1:
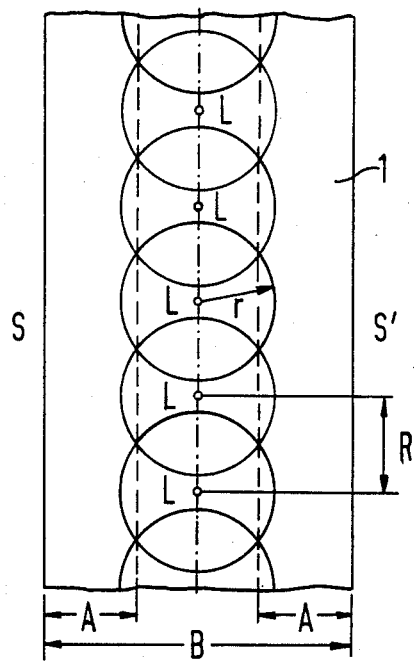
FIG. 1 is a cutaway view of an unwound capacitor foil according to a first embodiment of the present invention.

In FIG. 1 is shown as a cutaway portion an unrolled dielectric strip 1, where a number of impregnation holes L are arranged on the unrolled surface. The dielectric strip 1, which has a width B, is properly impregnated from its end faces S, S' approximately to the depth A. For a dielectric strip of polypropylene and an impregnant of mineral oil, the distance A may be 30 mm for example. The central section of the dielectric strip 1 would therefore, not be impregnated, or not sufficiently so, without the presence of the impregnation holes L arranged according to the invention. The distance R of the impregnation holes L from each other must be selected so that the impregnation reach r is sufficient to supply the dielectric strip 1 with the necessary impregnant at all points. When determining these dimensions it must be noted that the maximum attainable impregnation reach r of the impregnation holes L is smaller than the impregnation depth A which is reached from the end faces S, S' of the capacitor coil. Whereas the impregnation depth A from the end faces into the coil is 30 mm for example, the impregnation reach r is only 25 mm for an impregnation hole diameter of about 2 mm. Further it must be noted that there is a relationship between the diameter of the impregnation holes L and the impregnation reach r; in particular, the impregnation reach decreases with smaller hole diameters. This is because the flow resistance through the narrow gaps in the hole region affects the impregnation reach. There is an optimum hole diameter which strikes a balance between the impregnation rate and the loss of capacitance due to the holes. This optimum depends on the oil gaps, which in turn are determined by the coil construction. For capacitor coils which have dielectric strips formed of polypropylene foil 8 microns thick and electrodes formed of paper strips 9 microns thick that are metallized on both sides and arranged in the fieldfree space, the impregnation holes L have an optimum diameter of 2 mm when a mineral oil is used as impregnant.

At diameters of the impregnation holes L which are less than 0.5 mm, proper impregnation no longer occurs.

Figure 2:
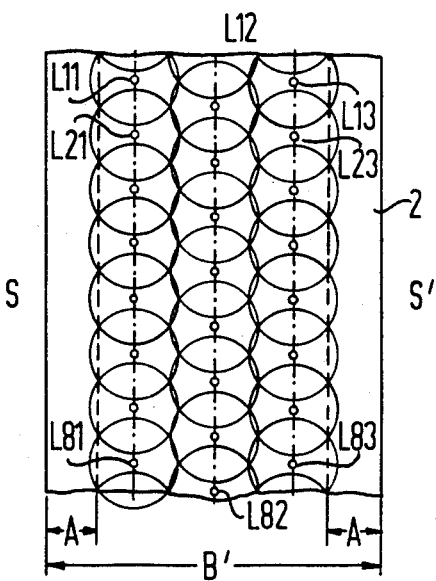
FIG. 2 is a cutaway view of an unwound capacitor according to a second embodiment.

FIG. 2 shows a cutaway portion of an unrolled dielectric strip 2 having a width B' which is greater than the width B of the embodiment shown in FIG. 1. Assuming identical conditions - that is, the same material for the dielectric strips 2 and the same impregnant as for the embodiment of FIG. 1 - a single row of holes on the generated surface in the center plane between the two end contact faces S, S' is no longer sufficient for proper impregnation. For a dielectric strip 2 of polypropylene having a width B' of 190 mm, therefore, three parallel rows of impregnation holes L 11, L 21, . . . L 81 . . . ; L 12, L 22, ..., L 82, ... and L 3, L 23, ... L 83, ... are required.

The impregnation holes L are produced after winding by drilling radially, which drilling can be done automatically, for example. Then follows, as the next manufacturing step, the so-called "burn in" process which effects regeneration.

The capacitor defects at the impregnation holes L are eliminated during the burn-in process. The self-healing at these drilling points is excellent, since regeneration gases escape through these impregnation holes L and high pressures cannot build up. Consequently, insulating edges are formed on the metallized foils all around the drill holes.

After the burn-in process the capacitor is dried and impregnated. The presence of the impregnation holes considerably shortens the drying time since the water diffuse concentrically to the holes and need not take the long path to the end faces.

The burn-in voltages are higher than the operating voltages, so that after impregnation the holes are electrically fully stabilized.

The loss of capacitance due to the impregnation holes is relatively small; in the stated example it amounts to about 0.3%.

Figure 3:
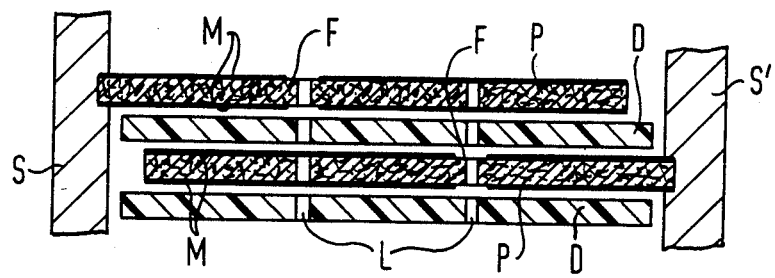
FIG. 3 is a sectional view of a wound capacitor according to one realization of the invention.

FIG. 3 shows a partial section through a capacitor having a construction which is suitable for higher voltages. The dielectric strips D consist, for example, of polypropylene, while the electrodes are formed of thin metal layers M capable of regeneration arranged on paper strips P. The metal layers M which are disposed on opposite surfaces of the paper strips P are connected together by the end contact layers S, S' so that the coated support strip P is arranged in the field-free space. The metal layers M exhibit free strips F, producing a capacitor construction with an internal series connection. Preferably the impregnation holes L are arranged in the zone of these free strips F. Since there is no electric field in these free strips F, no defects can come about that would cause a capacitance decrease due to burn-in.

Figure 4:
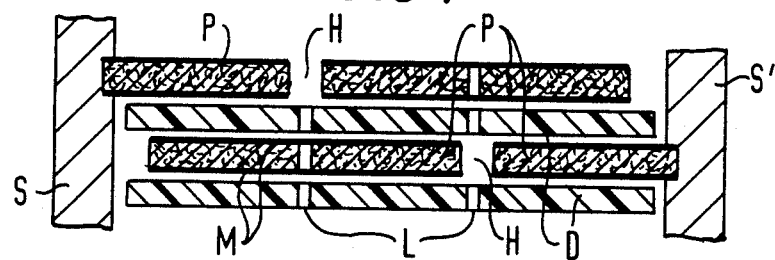
FIG. 4 is a sectional view of a wound capacitor according to another realization of the invention.

FIG. 4 shows still another embodiment, which in principle corresponds to the embodiment of FIG. 3, but where capacitively inactive strip type cavities H are arranged on the coated paper strips P. Preferably the impregnation holes L are disposed in the zone of these cavities H. As these strip type cavities H are generally very thick (e.g. 10 μm) in comparison with the narrow impregnation gaps (<0.5 μm), the impregnation resistance in the cavities H is negligible relative to the impregnation gaps. For this construction, therefore, only one impregnation hole per perimeter and gap is needed. Thus, for example if a capacitor of coil width 190 mm (as shown in FIG. 2) would have a construction with double inner series connection, the number of holes L 12 ... L n2 would be reduced to one hole.

If the coils are wound on cores, preferably also the core should be pierced, in order that the impregnating liquid can get into the coil also from the core hole.

Figure 5:
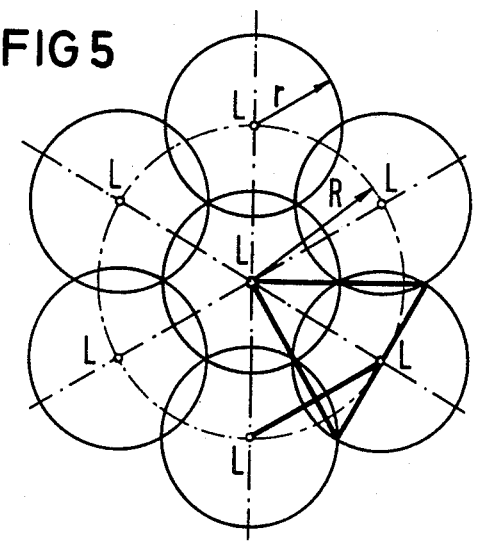
FIG. 5 is a diagram showing the spacing of the impregnation holes according to the present invention.

The embodiments shown in FIG. 1–4 represent specific examples. As mentioned above, the impregnation reach r depends on the design of the coil and the impregnant used. The invention relates generally to the feature that the impregnation holes L on the generated coil surface may exhibit, with an impregnation reach r, a maximum spacing of $$R = r\sqrt{3},$$

since every point of the coil will then be reached by the impregnant. This general principle is graphically illustrated in FIG. 5.

In addition to the embodiments shown in the figures, the idea of the invention can be applied also in other capacitor constructions, for example, where the electrodes are arranged directly on the plastic foils. Furthermore, the invention may be used with all known materials as plastic foils and impregnants.

There has thus been shown and described a novel impregnated wound capacitor which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention which is limited only by the claims which follow.

What is claimed is:

1. In an impregnated, wound capacitor comprising (a) dielectric strips which consist at least in part of plastic foils swelled by an impregnant; (b) electrodes formed of regenerable, thin metal layers arranged adjacent at least a part of said dielectric strips, respective ones of said electrodes being connected together at opposite end faces of the capacitor coil by means of end contact layers, thereby defining electrodes of opposite polarity;
    the improvement comprising impregnation holes arranged in the dielectrically active part of the capacitor coil having a maximum spacing R, between successive holes, equal to $R = r\sqrt{3}$, where r is the impregnation reach.

2. The impregnated, wound capacitor defined in claim 1, wherein said impregnation holes have a diameter greater than 0.5 mm.

3. The impregnated, wound capacitor defined in claim 1, wherein said dielectric strips are made of polypropylene foil and the electrodes are formed of paper strips having metal layers disposed on both sides, said paper strips being arranged in a field-free space between said metal layers.

4. The impregnated, wound capacitor defined in claim 3, wherein said dielectric strips are approximately 8 microns thick and said paper strips are approximately 9 microns thick, and wherein said holes have a diameter of approximately 2 mm, and said capacitor coil is impregnated with mineral oil.

5. The impregnated, wound capacitor according to claim 1, wherein said electrodes are arranged to provide an inner series connection, and wherein said impregnation holes extend in the radial direction in regions of inner cavities or free strips, respectively.

* * * * *